Dec. 16, 1941.   W. FERRIS   2,266,184
BROACHING MACHINE
Filed Oct. 24, 1938   2 Sheets-Sheet 1
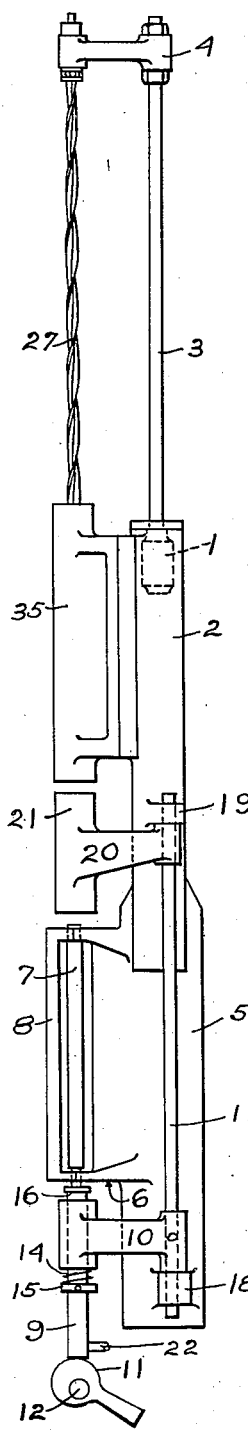
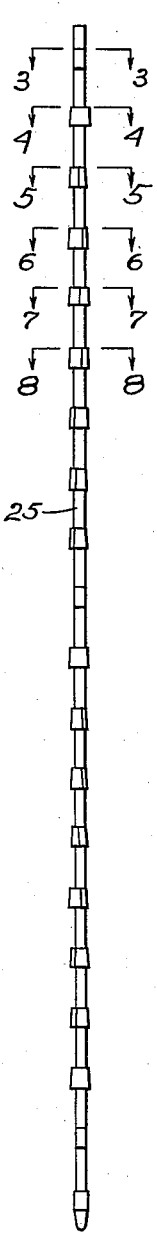
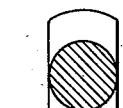
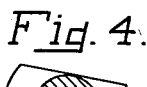
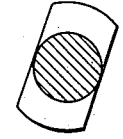
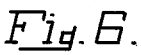
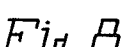
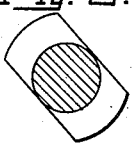
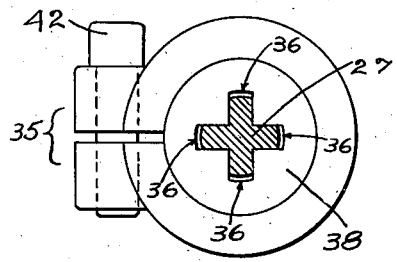
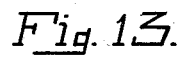
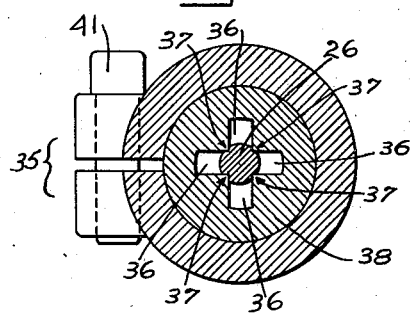
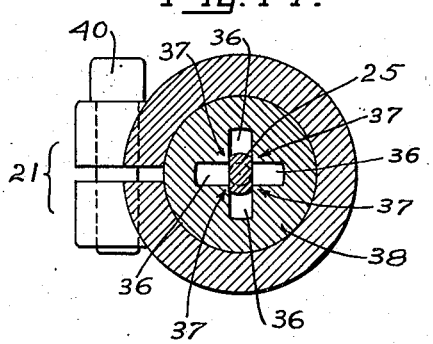
INVENTOR.
WALTER FERRIS
BY Wesley P. Merrill
ATTORNEY.

Dec. 16, 1941.  W. FERRIS  2,266,184
BROACHING MACHINE
Filed Oct. 24, 1938  2 Sheets-Sheet 2
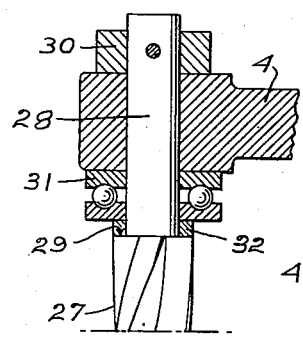
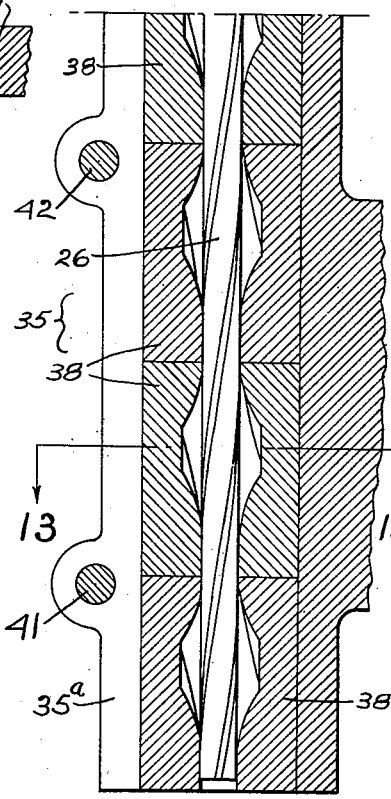
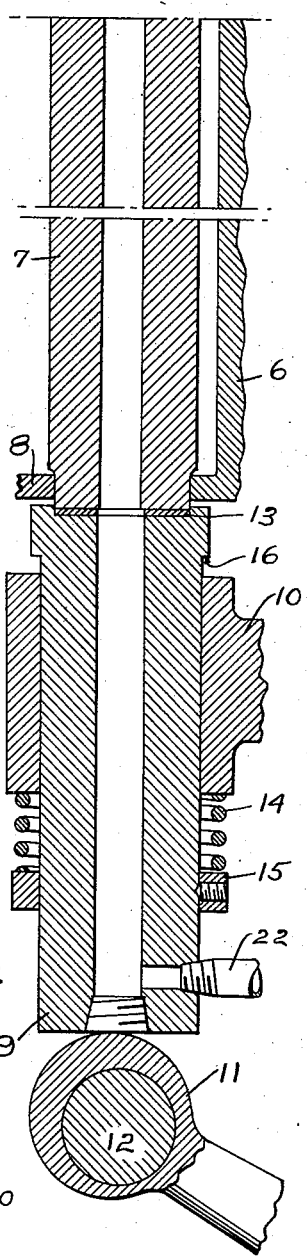
INVENTOR.
WALTER FERRIS
BY
ATTORNEY.

Patented Dec. 16, 1941

2,266,184

UNITED STATES PATENT OFFICE 2,266,184

BROACHING MACHINE

Walter Ferris, Milwaukee, Wis.

Application October 24, 1938, Serial No. 236,619

19 Claims. (Cl. 90—28.1)

This invention relates to broaching splined holes which are small in diameter relative to the length of the broach used to broach the hole or to the length of the rod required to push the broach through the hole.

A spline broach may be pulled through a small diameter hole by a stem which is fixed to the broach and is small enough to pass through the hole, or the broach may be pushed through the hole by a push rod which is small enough to pass through the hole but, if the broach is long enough to carry the number of teeth usually employed or if the hole is so deep that a long push rod must be employed to push the broach completely through the hole, the broach or the push rod will buckle under the force required to push the broach through the hole.

The present invention has as an object to provide means for pushing a spline broach through a small diameter hole and for preventing the broach or its push rod from buckling under the force required to push the broach through the hole.

Another object is to provide means for accurately alining the broach with the hole to be broached.

Another object is to provide means for causing a broach for cutting helical grooves to rotate at the correct rate as it is pushed into the hole.

Another object is to provide means for positively alining the teeth on a spline broach with the grooves cut by a preceding broach.

Other objects and advantages of the invention will appear from the description hereinafter given of broaching apparatus in which the invention is embodied.

According to the invention in its general aspect, splines or grooves are cut in the wall of a small diameter hole by a spline broach which is pushed through the hole by a broaching force applied to one end of a large pusher having longitudinal ribs extending far enough from its axis to prevent the pusher from buckling when the broaching force is applied thereto, the broaching force is transmitted to the broach through the large pusher and through a small pusher which is small enough in diameter to follow the broach through a hole to be broached and would therefore buckle under the broaching force if unsupported, and the small pusher is fitted in and prevented from buckling by a guide which is arranged in alinement with the hole to be broached and is provided with grooves deep enough to accommodate the ribs on the large pusher so that the large pusher may slide through the guide and advance the small pusher far enough to cause it to push the broach completely through the hole.

The guide may be made long enough to also accommodate the broach in which case the grooves in the guide correspond to but are deeper than the teeth on the broach. Also, that part of the guide which accommodates the broach may be separate from the other part and be movable out of alinement therewith in order that the broach may be readily inserted in that section of the guide.

If the broach is adapted to cut helical grooves, such as the rifling in a gun barrel, the grooves in the guide are arranged in helixes having the same pitch as the grooves to be cut.

The invention is exemplified by the broaching apparatus shown in part in detail and in part schematically in the accompanying drawings in which the views are as follows:

Fig. 1 is an elevation of a broaching machine to which the invention has been applied; the hydraulic circuit, the controls and the supporting and guiding structures having been omitted as they form no part of the invention and may be of any suitable type.

Fig. 2 is an elevation of a helical spline broach which may be employed in the machine shown in Fig. 1, the broach being shown on a larger scale than the machine.

Figs. 3, 4, 5, 6, 7 and 8 are enlarged sections through the broach taken, respectively, on the lines 3—3, 4—4, 5—5, 6—6, 7—7, and 8—8 of Fig. 2.

Figs. 9, 10 and 11 together show the guides, work piece and broach receiver in vertical section and the broach and broach pusher in elevation with certain parts broken away. Fig. 10 is a continuation of Fig. 9 and Fig. 11 is a continuation of Fig. 10. The parts shown in these figures have been considerably enlarged in respect to Fig. 1 but the figures are not to scale as they have been enlarged about four times as much in width as in length in order to clearly show the broach and small pusher.

Fig. 12 is a sectional plan view taken on the line 12—12 of Fig. 9 and showing the large pusher fitted to slide in grooves formed in the guide.

Fig. 13 is a sectional plan view taken on a line 13—13 of Fig. 10 and showing the small pusher fitted to slide in the grooves formed in the guide.

Fig. 14 is a sectional plan view taken on a line 14—14 of Fig. 10 and showing the broach fitted in the grooves formed in the guide.

For the purpose of illustration, the invention has been shown applied to a hydraulic broaching machine which is employed for cutting grooves or rifling in gun barrels but it is to be understood that the invention may be applied to other types of machines and employed for other purposes.

As shown, a piston 1 is fitted in a cylinder 2 and provided with a piston rod 3 which has an arm or head 4 fixed to its upper end for pushing a tool through the work as will presently appear.

Cylinder 2 is fixed to a stationary frame 5 having fixed thereon a work holder 6 in which a gun barrel 7 may be clamped by means of removable cap 8, the upper and lower ends of work holder 6 being shaped to receive the reduced ends of the gun barrel as shown in Figs. 10 and 11.

Gun barrel 7 is adapted to be supported at its lower end by a tool receiver 9 which is fitted for axial sliding movement in a swingable bracket 10 and is adapted to be moved upward against the lower end of barrel 7 by a cam 11 journaled upon a stationary pivot 12. The upper end of receiver 9 has a small recess formed therein and a gasket 13 arranged in the recess to form a fluid tight joint between receiver 9 and barrel 7.

Tool receiver 9 is urged downward by a spring 14 arranged around it between the lower face of bracket 10 and a collar 15 which is fastened to receiver 9. The downward movement of receiver 9 is limited by the upper face of bracket 10 being engaged by a shoulder 16 which is formed on receiver 9 near the upper end thereof.

Bracket 10 is fixed upon a shaft 17 which is journaled in bearings 18 and 19 carried by frame 5 and cylinder 2 respectively. The upper face of bearing 18 engages bracket 10 and the lower face of bearing 19 engages a bracket 20 which is fixed upon shaft 17 so that shaft 17 is restrained from axial movement. Bracket 20 has fixed thereto in alinement with receiver 9 the lower section 21 of a guide which will presently be described.

The arrangement is such that, when receiver 9 and guide section 21 are in alinement with barrel 7 and the handle of cam 11 is depressed, cam 11 will move receiver 9 upward through bracket 10 and cause it to move barrel 7 upward and force the shoulder at its upper end against the upper part of work holder 6 and thereby securely clamp barrel 7 in position to be broached by a broach guided by lower guide section 21, the broach being cooled during the broaching operation by oil or other suitable liquid supplied under pressure to the interiors of receiver 9 and barrel 7 through a pipe 22 which connects the lower end of receiver 9 to a pump or other pressure source. Gasket 13 will form a tight joint between receiver 9 and barrel 7 and prevent the cooling liquid from escaping at that point.

When the handle of cam 11 is raised, the parts which were previously raised will move downward due to their weight and to the force exerted by spring 14. Shaft 17 may then be rotated to swing receiver 9 and guide section 21 out of alinement with barrel 7 so that a broach may be readily inserted in guide section 21 and the broach which has passed through barrel 7 may be removed from receiver 9 as by ejecting it and the chips therefrom by liquid supplied through pipe 22 to the lower end of receiver 9.

A rifle barrel ordinarily has four identical helical grooves formed therein and arranged 90° apart. Such grooves may be cut in barrel 7 by a spline broach 25 (Fig. 2) which has a plurality of cutting teeth formed thereon and arranged in four identical helical rows corresponding to the grooves to be cut.

Each tooth is arranged in the same transverse plane as a tooth in the opposite row and forms therewith a pair of teeth. Each pair of teeth is spaced from the adjacent pairs of teeth to provide spaces to accommodate the chips cut from the gun barrel as the broach is forced therethrough. Alternate pairs of teeth cut different grooves, and each tooth in each row is offset angularly from the preceding tooth in that row to thereby form a helical row, the teeth shown in Figs. 3, 5 and 7 forming parts of two opposite rows and the teeth shown in Figs. 4, 6 and 8 forming parts of the other two rows.

The cutting faces are preferably ground to such an angle to the axis of the broach that the broaching force tends to rotate the broach at the correct rate to cause the first teeth to cut grooves in helixes corresponding to the helixes in which the teeth are arranged but this method of starting the grooves may not be dependable. It is therefore desirable to positively rotate the broach at the correct rate as it enters the bore of the gun barrel. It is also necessary to support the broach against buckling as already stated. Both objectives are accomplished by passing the broach through guide section 21 as will presently be explained.

Broach 25 is pushed through barrel 7 by a small pusher 26 which is long enough to push broach 25 completely through barrel 7 and small enough in diameter to freely follow the broach therethrough.

Since it would not be practical to enter one end of broach 25 in the bore of barrel 7 and then manually hold the broach in alinement with pusher 26 while the broaching force is applied, it is obvious that broach 25 should be guided as by means of guide tube section 21. Therefore, in order that pusher 26 may push broach 25 completely through barrel 7, it must be somewhat longer than the combined lengths of barrel 7 and broach 25 and consequently so long relative to its diameter it would buckle under the broaching force if unsupported.

For example, the barrel of a 30 caliber machine gun is about 24" long. If broach 25 were 12" long, pusher 26 would have to be more than 36" long and less than $\frac{3}{16}$" in diameter. It is obvious that a pusher or rod of such dimensions, if unsupported, would buckle under the force required to push the broach through the barrel. Even if the broach could be guided into the barrel by hand and thereby avoid the use of a broach guide, the pusher would have to be more than 24" long and hence so long relative to its diameter that it would buckle under the broaching force if unsupported.

In order to prevent pusher 26 or broach 25 from buckling, a guide is arranged in alinement with the hole to be broached, pusher 26 and broach 25 are arranged within the guide and pushed therethrough by a large pusher which is large enough in diameter to prevent it from buckling when the broaching force is applied thereto, and the guide and the large pusher are so shaped that the guide prevents pusher 26 and broach 25 from buckling and the large pusher can pass freely through the guide.

As shown, small pusher 26 is fastened to or formed integral with a large pusher 27 the outside diameter of which is great enough to prevent it from buckling when transmitting a broach force at least as great as the force required to push broach 25 through barrel 7.

In order that small pusher 26 may be as large as possible in diameter and still freely follow broach 25 through barrel 7, it is provided with four small helical ribs shown in Figs. 10 and 13. These ribs are arranged the same angular distance apart and have the same pitch as the helical rows of teeth on broach 25 so that they are complementary to the grooves cut in barrel 7 by broach 25.

Large pusher 27 consists primarily of four spiral ribs which are joined together to form a pusher which is substantially cross-shaped in section at any given point as shown in Fig. 12. The ribs on pusher 27 form continuations of and have the same pitch as the ribs on small pusher 26 but they are large enough to form a pusher having sufficient diameter to prevent it from buckling when the broaching force is transmitted therethrough.

Large pusher 27 is provided at its upper end with a cylindrical bearing portion 28 which is smaller in diameter than the ribbed portion to form a shoulder 29 at its junction therewith as shown in Fig. 9.

Bearing portion 28 is journaled in the outer end of arm 4 and has a thrust collar 30 fixed to its upper end to engage the upper face of arm 4 and thereby support the pushers and enable arm 4 to move them upward.

In order that the pushers may rotate freely during the broaching operation, the broaching force is transmitted through an anti-friction bearing 31 which has its upper face in contact with the lower face of arm 4 and its lower face in contact with a thrust washer 32 arranged upon bearing portion 28 in contact with shoulder 29.

Small pusher 26 while outside of the gun barrel or other work piece is prevented from buckling during the broaching operation by a guide which may be continuous throughout its length but which has been shown as consisting of lower guide section 21, which is swingable out of alinement with the upper section to facilitate inserting the broach therein as previously explained, and a stationary upper section 35 which has been shown as being fixed to cylinder 2.

Guide sections 21 and 35 have formed therein four deep helical grooves 36 which intersect each other and are spaced 90° apart to form four guide ribs 37 as shown in Figs. 12 and 13.

Grooves 36 have the same pitch as the rows of teeth on broach 25 and the ribs on the pushers and are deep enough to permit large pusher 27 to slide freely through guide sections 21 and 35 as shown in Fig. 12.

Broach 25 is initially arranged in guide section 21 with its rows of teeth arranged in grooves 36 as shown in Fig. 14. When a broaching force is applied to advance broach 25 into barrel 7, the sides of the broach teeth ride upon the inner edge portions of guide ribs 37 which prevent the broach from buckling and cause it to rotate as it advances so that it must start to cut grooves of the correct pitch in barrel 7.

Small pusher 26 is initially arranged in guide section 35 with its ribs fitted in grooves 36 so that, when a broaching force is applied to large pusher 27, small pusher 26 is prevented from buckling while in the guide by the inner edge portions of guide ribs 37 which engage the sides of the ribs on small pusher 26 as shown in Fig. 13.

After small pusher 26 passes into barrel 7, it is prevented from buckling by the faces or edges of its ribs engaging the bottoms or sides of the grooves cut in barrel 7 by broach 25.

Each of guide sections 21 and 35 may be a unitary structure and have grooves 36 formed therein by any suitable process but, in order to keep the cost of manufacture to a minimum, grooves 36 may be formed in a plurality of bushings 38 each of which is short enough to have the grooves broached therein on an ordinary broaching machine, and the bushings are fastened in a tube with the grooves in each bushing alined with the grooves in the adjacent bushings.

As shown, guide section 21 consists of a split tube 21ª, which is fixed to bracket 20, and a plurality of bushings 38 which are clamped in tube 21ª as by means of bolts 39 and 40. Guide section 35 consists of a split tube 35ª, which is fixed to cylinder 2, and a plurality of bushings 38 which are clamped in tube 35ª as by means of bolts 41 and 42. When the several parts are in the positions shown in the drawings and motor 1—2 is energized, arm 4 will force pushers 26 and 27 downward and pusher 26 will push broach 25 out of guide section 21 into and through barrel 7. Ribs 37 in guide section 21 will cause broach 25 to rotate and thereby start to cut helical grooves of the correct pitch in barrel 7. Broach 25 and small pusher 26 will at first be supported by ribs 38 and later by barrel 7 and thereby be prevented from buckling. During the broaching operation, oil or other liquid under pressure flows through pipe 22, receiver 9 and barrel 7 and keeps the broach from overheating.

After broach 25 has been pushed completely through barrel 7, the flow of liquid through pipe 22 is stopped, motor 1—2 is reversed to retract pushers 26 and 27, cam 11 is rotated to permit receiver 9 to descend, and shaft 17 is rotated to swing receiver 9 and guide section 21 out of alinement with barrel 7 and guide section 35.

Liquid under pressure is again supplied to the lower end of receiver 9 to raise broach 25 so that the operator can remove it and to blow the chips out of receiver 9.

If broach 25 does not complete the broaching of barrel 7, a second broach is inserted in guide section 21, the several parts are returned to the positions shown and the operation is repeated.

If barrel 7 is broached in one operation, it is removed and a new barrel is clamped in work holder 6, broach 25 is reinserted in guide section 21, the several parts are returned to the positions shown and the broaching operation is repeated.

The invention herein set forth is susceptible of various modifications and adaptations without departing from the scope of the appended claims in which the term "small" is employed to designate the diameter of the hole, the broach or the pusher relative to the length of the broach or the length of the pusher.

The invention is hereby claimed as follows:
1. The combination, with a spline broach for broaching a hole so small in diameter that a pusher small enough in diameter to pass through said hole if unsupported would buckle under the force required to enable it to push said broach through said hole, of a guide arranged in axial alinement with said hole, a small pusher for pushing said broach through said hole fitted in said guide and being small enough in diameter to pass through said hole, a large pusher arranged in axial alinement with said small pusher and being large enough in diameter to prevent it from buckling under the force required to push said broach through said hole, and means for applying a broaching force to said large pusher upon the outer end thereof to advance the same and thereby cause said small pusher to push said broach through said hole, said guide and said large pusher being so shaped that said guide will prevent said small pusher from buckling and said large pusher will pass freely through said guide.

2. The combination, with a spline broach for broaching a hole so small in diameter that a pusher small enough in diameter to pass through said hole if unsupported would buckle under the force required to enable it to push said broach through said hole, of a guide arranged in axial alinement with said hole, a small pusher for pushing said broach through said hole fitted in said guide and being small enough in diameter to pass through said hole, a large pusher fixed at one end to said small pusher and arranged in axial alinement therewith and being large enough in diameter to prevent it from buckling under the force required to push said broach through said hole, and means for applying a broaching force to said large pusher upon the outer end thereof to advance the same and thereby cause said small pusher to push said broach through said hole, said guide and said large pusher being so shaped that said guide will prevent said small pusher from buckling and said large pusher will pass freely through said guide.

3. The combination, with a spline broach for broaching a hole so small in diameter that a pusher small enough in diameter to pass through said hole if unsupported would buckle under the force required to enable it to push said broach through said hole, of a guide arranged in axial alinement with said hole, a small pusher for pushing said broach through said hole fitted in said guide and being small enough in diameter to pass through said hole, a large pusher arranged in axial alinement with said small pusher and being large enough in diameter to prevent it from buckling under the force required to push said broach through said hole, means for applying a broaching force to said large pusher upon the outer end thereof to advance the same and thereby cause said small pusher to push said broach through said hole, said guide and said large pusher being so shaped that said guide will prevent said small pusher from buckling and said large pusher will pass freely through said guide, a tool receiver for receiving said broach after it has passed through said hole, and means for moving said receiver into and out of alinement with said hole.

4. The combination, with a spline broach for broaching a hole so small in diameter that a pusher small enough in diameter to pass through said hole if unsupported would buckle under the force required to enable it to push said broach through said hole, of a guide arranged in axial alinement with said hole, a small pusher for pushing said broach through said hole fitted in said guide and being small enough in diameter to pass through said hole, a large pusher fixed at one end to said small pusher and arranged in axial alinement therewith and being large enough in diameter to prevent it from buckling under the force required to push said broach through said hole, means for applying a broaching force to said large pusher upon the outer end thereof to advance the same and thereby cause said small pusher to push said broach through said hole, said guide and said large pusher being so shaped that said guide will prevent said small pusher from buckling and said large pusher will pass freely through said guide, a tool receiver for receiving said broach after it has passed through said hole, and means for moving said receiver into and out of alinement with said hole.

5. The combination, with a small diameter spline broach for broaching a small diameter hole formed in a work piece, of a guide arranged in axial alinement with said hole, a small pusher for pushing said broach through said hole fitted in said guide and being small enough in diameter to pass through said hole, a large pusher arranged in axial alinement with said small pusher and being large enough in diameter to prevent it from buckling under the force required to push said broach through said hole, means for applying a broaching force to said large pusher upon the outer end thereof to advance the same and thereby cause said small pusher to push said broach through said hole, said guide and said large pusher being so shaped that said guide will prevent said small pusher from buckling and said large pusher will pass freely through said guide, a tool receiver arranged in alinement with said hole to receive said broach after it has passed through said hole, means for moving said receiver against said work piece, and means for directing cooling liquid through said receiver into said hole during the broaching operation.

6. The combination, with a small diameter spline broach for broaching a small diameter hole formed in a work piece, of a guide arranged in axial alinement with said hole and divided into two sections one of which is stationary and the other of which is movable out of and into alinement with said stationary section and adapted to receive and guide said broach into said hole, a small pusher for pushing said broach through said hole fitted in said guide and being small enough in diameter to pass through said hole, a large pusher arranged in axial alinement with said small pusher and being large enough in diameter to prevent it from buckling under the force required to push said broach through said hole, and means for applying a broaching force to said large pusher upon the outer end thereof to advance the same and thereby cause said small pusher to push said broach out of said movable guide section and through said hole, said guide and said large pusher being so shaped that said guide will prevent said small pusher and said broach from buckling and said large pusher will pass freely through said guide.

7. The combination, with a small diameter spline broach for broaching a small diameter hole formed in a work piece, of a guide arranged in axial alinement with said hole and divided into two sections one of which is stationary and the other of which is movable out of and into alinement with said stationary section and adapted to receive and guide said broach into said hole, a small pusher for pushing said broach through said hole fitted in said guide and being small enough in diameter to pass through said hole, a large pusher fixed at one end to said small pusher and arranged in axial alinement therewith and being large enough in diameter to prevent it from buckling under the force required to push said broach through said hole, and means for applying a broaching force to said large pusher upon the outer end thereof to advance the same and thereby cause said small pusher to push said broach out of said movable guide section and through said hole, said guide and said large pusher being so shaped that said guide will prevent said small pusher and said broach from buckling and said large pusher will pass freely through said guide.

8. The combination, with a small diameter spline broach for broaching a small diameter hole formed in a work piece, of a guide arranged in axial alinement with said hole and divided into two sections one of which is stationary and the other of which is movable out of and into alinement with said stationary section and adapted to receive and guide said broach into said hole, a small pusher for pushing said broach through said hole fitted in said guide and being small enough in diameter to pass through said hole, a large pusher arranged in axial alinement with said small pusher and being large enough in diameter to prevent it from buckling under the force required to push said broach through said hole, means for applying a broaching force to said large pusher upon the outer end thereof to advance the same and thereby cause said small pusher to push said broach out of said movable guide section and through said hole, said guide and said large pusher being so shaped that said guide will prevent said small pusher and said broach from buckling and said large pusher will pass freely through said guide, a tool receiver for receiving said broach after it has passed through said hole, and means for moving said receiver into and out of alinement with said hole.

9. The combination, with a spline broach for broaching a hole so small in diameter that a pusher small enough in diameter to pass through said hole if unsupported would buckle under the force required to enable it to push said broach through said hole, of a guide arranged in axial alinement with said hole and provided with internal ribs and with grooves between said ribs, a small pusher for pushing said broach through said hole fitted in said guide and prevented from buckling by the inner edges of said ribs, a large pusher shaped to fit said guide and extending beyond the end thereof, and means for applying a broaching force to the outer end of said large pusher to move it through said guide and cause said small pusher to push said broach through said hole, said large pusher being provided with ribs which correspond to the grooves in said guide and are large enough to prevent it from buckling when transmitting said broaching force to said small pusher.

10. The combination, with a spline broach for broaching a hole so small in diameter that a pusher small enough in diameter to pass through said hole if unsupported would buckle under the force required to enable it to push said broach through said hole, of a guide arranged in axial alinement with said hole and provided with internal ribs and with grooves between said ribs, a small pusher for pushing said broach through said hole fitted in said guide and prevented from buckling by the inner edges of said ribs, a large pusher shaped to fit said guide and fixed at one end to said small pusher, and means for applying a broaching force to the outer end of said large pusher to move it through said guide and cause said small pusher to push said broach through said hole, said large pusher being provided with ribs which correspond to the grooves in said guide and are large enough to prevent it from buckling when transmitting said broaching force to said small pusher.

11. The combination, with a spline broach for broaching a hole so small in diameter that a pusher small enough in diameter to pass through said hole if unsupported would buckle under the force required to enable it to push said broach through said hole, of a guide arranged in axial alinement with said hole and provided with internal ribs and with grooves between said ribs, a small pusher for pushing said broach through said hole fitted in said guide and prevented from buckling by the inner edges of said ribs, a large pusher shaped to fit said guide and extending beyond the end thereof, means for applying a broaching force to the outer end of said large pusher to move it through said guide and cause said small pusher to push said broach through said hole, said large pusher being provided with ribs which correspond to the grooves in said guide and are large enough to prevent it from buckling when transmitting said broaching force to said small pusher, a tool receiver for receiving said broach after it has passed through said hole, and means for moving said receiver into and out of alinement with said hole.

12. In a machine for broaching a small diameter hole formed in a work piece, the combination of a guide arranged in axial alinement with said hole and provided with internal ribs and grooves between said ribs, said guide being divided into two sections one of which is stationary and the other of which is movable out of and into alinement with said stationary section, a spline broach fitted in said movable guide section and prevented from buckling by the inner edges of said ribs, a small pusher for pushing said broach out of said movable guide section and through said hole fitted in said stationary guide section and prevented from buckling by the inner edges of said ribs, a large pusher shaped to fit said guide and extending beyond the end thereof, and means for applying a broaching force to the outer end of said large pusher to move it through said guide and cause said small pusher to push said broach through said hole, said large pusher being provided with ribs which correspond to the grooves in said guide and are large enough to prevent it from buckling when transmitting said broaching force to said small pusher.

13. In a machine for broaching a small diameter hole formed in a work piece, the combination of a guide arranged in axial alinement with said hole and provided with internal ribs and grooves between said ribs, said guide being divided into two sections one of which is stationary and the other of which is movable out of and into alinement with said stationary section, a spline broach fitted in said movable guide section and prevented from buckling by the inner edges of said ribs, a small pusher for pushing said broach out of said movable guide section and through said hole fitted in said stationary guide section and prevented from buckling by the inner edges of said ribs, a large pusher shaped to fit said guide and fixed at one end to said small pusher, and means for applying a broaching force to the outer end of said large pusher to move it through said guide and cause said small pusher to push said broach through said hole, said large pusher being provided with ribs which correspond to the grooves in said guide and are large enough to prevent it from buckling when transmitting said broaching force to said small pusher.

14. In a machine for broaching a small diameter hole formed in a work piece, the combination of a guide arranged in axial alinement with said hole and provided with internal ribs and grooves between said ribs, said guide being divided into two sections one of which is stationary and the other of which is movable out of and into alinement with said stationary section, a spline broach fitted in said movable guide section and prevented from buckling by the inner edges of said ribs, a small pusher for pushing said broach out of said movable guide section and through said hole fitted in said stationary guide section and prevented from buckling by the inner edges of said ribs, a large pusher shaped to fit said guide and extending beyond the end thereof, means for applying a broaching force to the outer end of said large pusher to move it through said guide and cause said small pusher to push said broach through said hole, said large pusher being provided with ribs which correspond to the grooves in said guide and are large enough to prevent it from buckling when transmitting said broaching force to said small pusher, a tool receiver for receiving said broach after it has passed through said hole, and means for moving said receiver into and out of alinement with said hole.

15. In a machine for broaching helical splines in the wall of a small diameter hole formed in a work piece, the combination of a guide arranged in alinement with said hole and provided with internal helical ribs and helical grooves between said ribs, said grooves corresponding to but being deeper than said splines, a spline broach fitted in said guide and prevented from buckling by the inner edges of said ribs and having teeth formed therein in helical rows and arranged in said grooves, a small pusher for pushing said broach out of said guide and through said hole fitted in said guide and prevented from buckling by the inner edges of said ribs, a large pusher shaped to fit said guide and extending beyond the end thereof, and means for applying a broaching force to the outer end of said large pusher to move it through said guide and cause said small pusher to push said broach through said hole, said large pusher being provided with helical ribs which correspond to the grooves in said guide and are large enough to prevent it from buckling when transmitting said broaching force to said small pusher.

16. In a machine for broaching helical splines in the wall of a small diameter hole formed in a work piece, the combination of a guide arranged in alinement with said hole and provided with internal helical ribs and helical grooves between said ribs, said grooves corresponding to but being deeper than said splines, a spline broach fitted in said guide and prevented from buckling by the inner edges of said ribs and having teeth formed therein in helical rows and arranged in said grooves, a small pusher for pushing said broach out of said guide and through said hole fitted in said guide and prevented from buckling by the inner edges of said ribs, a large pusher shaped to fit said guide and fixed at one end to said small pusher, and means for applying a broaching force to the outer end of said large pusher to move it through said guide and cause said small pusher to push said broach through said hole, said large pusher being provided with helical ribs which correspond to the grooves in said guide and are large enough to prevent it from buckling when transmitting said broaching force to said small pusher.

17. In a machine for broaching helical splines in the wall of a small diameter hole formed in a work piece, the combination of a guide arranged in alinement with said hole and provided with internal helical ribs and helical grooves between said ribs, said grooves corresponding to but being deeper than said splines, a spline broach fitted in said guide and prevented from buckling by the inner edges of said ribs and having teeth formed therein in helical rows and arranged in said grooves, a small pusher for pushing said broach out of said guide and through said hole fitted in said guide and prevented from buckling by the inner edges of said ribs, said guide being divided into two sections one of which is stationary and the other of which is movable out of and into alinement with said stationary section to permit said brooach to be readily inserted in said movable section, a large pusher shaped to fit said guide and extending beyond the end thereof, and means for applying a broaching force to the outer end of said large pusher to move it through said guide and cause said small pusher to push said broach through said hole, said large pusher being provided with helical ribs which correspond to the grooves in said guide and are large enough to prevent it from buckling when transmitting said broaching force to said small pusher.

18. The method of broaching splines in the wall of a hole so small in diameter that a rod small enough in diameter to pass through the hole would buckle under the force required to push a spline broach through the hole, consisting of pushing a spline broach through the hole by means of a rod small enough to pass through the hole, guiding the rod before it enters the hole to prevent it from buckling, and positively rotating the broach during at least a part of its journey through the hole.

19. The method of broaching splines in the wall of a hole so small in diameter that a broach for broaching said splines would be so small in diameter relative to its length that if unsupported it would buckle under the force required to push it through the hole, consisting in pushing a spline broach through the hole by means of a rod small enough to pass through the hole, guiding the broach before it enters the hole to prevent it from buckling, and guiding the rod to prevent it from buckling.

WALTER FERRIS.